US011190452B2

(12) United States Patent
Monma et al.

(10) Patent No.: US 11,190,452 B2
(45) Date of Patent: Nov. 30, 2021

(54) VIRTUAL CUSTOMER PREMISES EQUIPMENT, POLICY MANAGEMENT SERVER AND SERVICE PROVIDING METHOD

(71) Applicant: NEC CORPORATION, Tokyo (JP)

(72) Inventors: Reiji Monma, Tokyo (JP); Susumu Takaku, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/635,305

(22) PCT Filed: Jul. 30, 2018

(86) PCT No.: PCT/JP2018/028429
§ 371 (c)(1),
(2) Date: Jan. 30, 2020

(87) PCT Pub. No.: WO2019/026837
PCT Pub. Date: Feb. 7, 2019

(65) Prior Publication Data
US 2021/0092067 A1 Mar. 25, 2021

(30) Foreign Application Priority Data
Jul. 31, 2017 (JP) .............................. JP2017-148625

(51) Int. Cl.
*H04L 12/851* (2013.01)
*H04L 12/16* (2006.01)
(Continued)

(52) U.S. Cl.
CPC .......... *H04L 47/2425* (2013.01); *H04L 12/16* (2013.01); *H04L 41/0893* (2013.01);
(Continued)

(58) Field of Classification Search
CPC . H04L 47/2425; H04L 12/16; H04L 41/0893; H04L 41/5051; H04L 41/5067; H04L 61/256; H04L 63/08
See application file for complete search history.

(56) References Cited

U.S. PATENT DOCUMENTS

| 6,088,725 A | 7/2000 | Kondo et al. |
| 6,917,605 B2 | 7/2005 | Kakemizu et al. |

(Continued)

FOREIGN PATENT DOCUMENTS

| JP | 10-051449 A | 2/1998 |
| JP | 2001-308932 A | 11/2001 |

(Continued)

OTHER PUBLICATIONS

International Search Report for PCT/JP2018/028429 dated Oct. 16, 2018 [PCT/ISA/210].

(Continued)

*Primary Examiner* — Duc C Ho
(74) *Attorney, Agent, or Firm* — Sughrue Mion, PLLC

(57) ABSTRACT

Virtual customer premises equipment includes: policy acquisition part configured to acquire, from predetermined policy management server that manages communication policies of users of the virtual customer premises equipment, communication policy that includes condition for providing service to be provided to a terminal that performs access via first customer premises equipment; and service providing part configured to provide a communication service to the terminal by referring to the communication policy. The policy acquisition part identifies a terminal that has moved to the first customer premises equipment from second customer premises equipment different from the first customer premises equipment, and acquires from the predetermined policy management server a communication policy including the condition for providing a service to be provided to (Continued)

the identified terminal; and the service providing part provides a communication service so as to satisfy the condition for providing a service defined in the communication policy of the identified terminal.

20 Claims, 10 Drawing Sheets

(51) Int. Cl.
    *H04L 12/24*     (2006.01)
    *H04L 29/12*     (2006.01)
    *H04L 29/06*     (2006.01)

(52) U.S. Cl.
    CPC ...... *H04L 41/5051* (2013.01); *H04L 41/5067* (2013.01); *H04L 61/256* (2013.01); *H04L 63/08* (2013.01)

(56) References Cited

U.S. PATENT DOCUMENTS

| | | |
|---|---|---|
| 7,346,039 B2 | 3/2008 | Oishi |
| 2001/0036164 A1 | 11/2001 | Kakemizu et al. |
| 2004/0081109 A1 | 4/2004 | Oishi |
| 2013/0031602 A1 | 1/2013 | Kimizuka |
| 2013/0132854 A1* | 5/2013 | Raleigh .................. H04W 4/60 715/738 |
| 2014/0181267 A1* | 6/2014 | Wadkins ............... H04L 69/163 709/219 |
| 2016/0241515 A1* | 8/2016 | Pai ........................ H04W 48/08 |
| 2016/0350148 A1 | 12/2016 | Kitagawa et al. |

FOREIGN PATENT DOCUMENTS

| | | |
|---|---|---|
| JP | 2004-153392 A | 5/2004 |
| JP | 2015-154423 A | 8/2015 |
| JP | 2016-057672 A | 4/2016 |
| JP | 2016-144030 A | 8/2016 |
| JP | 2016-224484 A | 12/2016 |
| WO | 2011/122138 A1 | 10/2011 |

OTHER PUBLICATIONS

Written Opinion for PCT/JP2018/028429 dated Oct. 16, 2018 [PCT/ISA/237].

* cited by examiner

VIRTUAL CUSTOMER PREMISES EQUIPMENT, POLICY MANAGEMENT SERVER AND SERVICE PROVIDING METHOD

CROSS-REFERENCE TO RELATED APPLICATIONS

This application is a National Stage of International Application No. PCT/JP2018/028429 filed Jul. 30, 2018, claims priority from Japanese Patent Application No. 2017-148625 (filed on Jul. 31, 2017) the contents of which are hereby incorporated in their entirety by reference into this specification.

The present disclosure relates to virtual customer premises equipment, a policy management server and a service providing method, and in particular, relates to virtual customer premises equipment (vCPE) where customer premises equipment (CPE) is virtualized, a policy management server and a service providing method.

BACKGROUND

In recent years, there have been proposals for virtualizing user side equipment, such as a broadband router, a cable modem, or a set top box, to be provided as virtual customer premises equipment (vCPE). Since the vCPE is disposed in a network, a user can use the vCPE for which he has contracted, from outside his home, and can receive services the same as in his home.

Patent Literature (PTL) 1 discloses a configuration that realizes secure terminal authentication when using vCPE. Specifically, a controller described in the same publication generates an authentication key for receiving a service that uses the vCPE outside the home, based on a user identifier and MAC address of a mobile terminal, in response to a demand to issue an authentication key received from a user mobile terminal via premises equipment and vCPE. The controller then issues the generated authentication key to the mobile terminal via the premises equipment and the vCPE. Next, on receiving the authentication key, the controller executes authentication processing based on the authentication key. This publication has a description that in a case of success in the authentication, the controller connects the vCPE or another vCPE that has a function the same as the vCPE, and the authentication key transmitting source, and enables provision of a service using a function of the vCPE.

Patent Literature 2 discloses a mobile network system in which it is possible to validly use an available network resource. According to the same publication there is a description that, by transmitting a message requesting registration that includes information of service content change, from a mobile terminal to an external agent apparatus, updating is performed on service control information related to the mobile terminal possessed by various types of node present in a communication path between the mobile terminal and the communication node.

[PTL 1]
Japanese Patent Kokai Publication No. JP2016-57672A
[PTL 2]
Japanese Patent Kokai Publication No. JP2001-308932A

SUMMARY

The following analysis is given according to the present disclosure. Fixed communication services provided these days have conditions of "providing best effort or guaranteed communication quality" or "fixed charge with no communication traffic limits", for each line (in other words, for each CPE terminating a line). In order to realize such a service, management is performed using a communication policy table in order to guarantee communication quality and service for each line, in a policy server such as a RADIUS (Remote Authentication Dial In User Service) server or the like. Specifically, when communication traffic from a certain terminal occurs, CPE or vCPE operate making reference to information in the communication policy table of the relevant line held in the RADIUS server. At this time, the CPE or vCPE may make reference to the communication policy table of the relevant line, with regard to the communication traffic, and not make reference to a communication policy table of another subscriber.

Meanwhile, since the vCPE is disposed in the network, the assumption of access from a location where the CPE is disposed is not necessary. Regarding future prospects, it is considered that there will be progress to a service mode of "providing communication quality (best effort or guarantee) and service (ISP service or cloud service by service operator) contracted for each user or each terminal" or "usage charge according to communication traffic for each user or terminal".

However, in realizing the service modes described above, it is necessary to change the management mechanism according to policy server such as the abovementioned RADIUS server. With regard to this point, Patent Literature 1 stops at disclosing a configuration in which a user accesses a vCPE from an arbitrary location different from his home, with no reference to how to have consistency in management.

It is a goal of the present disclosure to provide a vCPE (virtual customer premises equipment), a policy management server and a service providing method that can contribute to enriching service forms of a fixed communication service using vCPE.

According to a first aspect, virtual customer premises equipment is provided that includes: a policy acquisition part configured to acquire, from a predetermined policy management server that manages a communication policy of a user of the virtual customer premises equipment, a communication policy that includes a condition for providing a service to be provided to a terminal that provides access via first customer premises equipment; and a service providing part configured to provide a communication service to the terminal by referring to the communication policy. The policy acquisition part of the virtual customer premises equipment identifies a terminal that has moved to the first customer premises equipment from second customer premises equipment different from the first customer premises equipment, and acquires from the predetermined policy management server a communication policy including the condition for providing a service to be provided to the identified terminal. The service providing part provides a communication service so as to satisfy the condition for providing a service defined in the communication policy of the identified terminal.

According to a second aspect, a policy management server provides a communication policy to the abovementioned virtual customer premises equipment.

According to a third aspect, a service providing method is provided that includes: acquiring, from a predetermined policy management server that manages a communication policy of a user of virtual customer premises equipment, a communication policy that includes a condition for providing a service to be provided to a terminal that performs access via first customer premises equipment; and providing a communication service to the terminal by referring to the communication policy; and identifying a terminal that has moved to the first customer premises equipment from second customer premises equipment different from the first customer premises equipment, and acquiring a communication policy including a condition for providing a service to be provided to the identified terminal managed by the predetermined policy management server; and providing a communication service so as to satisfy the condition for providing a service defined in the communication policy of the identified terminal. This method is associated with a particular machine called a computer that configures the virtual customer premises equipment.

According to a fourth aspect, a computer program is provided for realizing functionality of the abovementioned virtual customer premises equipment. It is to be noted that this program may be recorded on a computer-readable (non-transient) storage medium. That is, the present disclosure may be embodied as a computer program product.

The meritorious effects of the present disclosure are summarized as follows.
According to the present disclosure it is possible to propose a new service mode in fixed communication services using vCPE.

PREFERRED MODES

Figure 1:
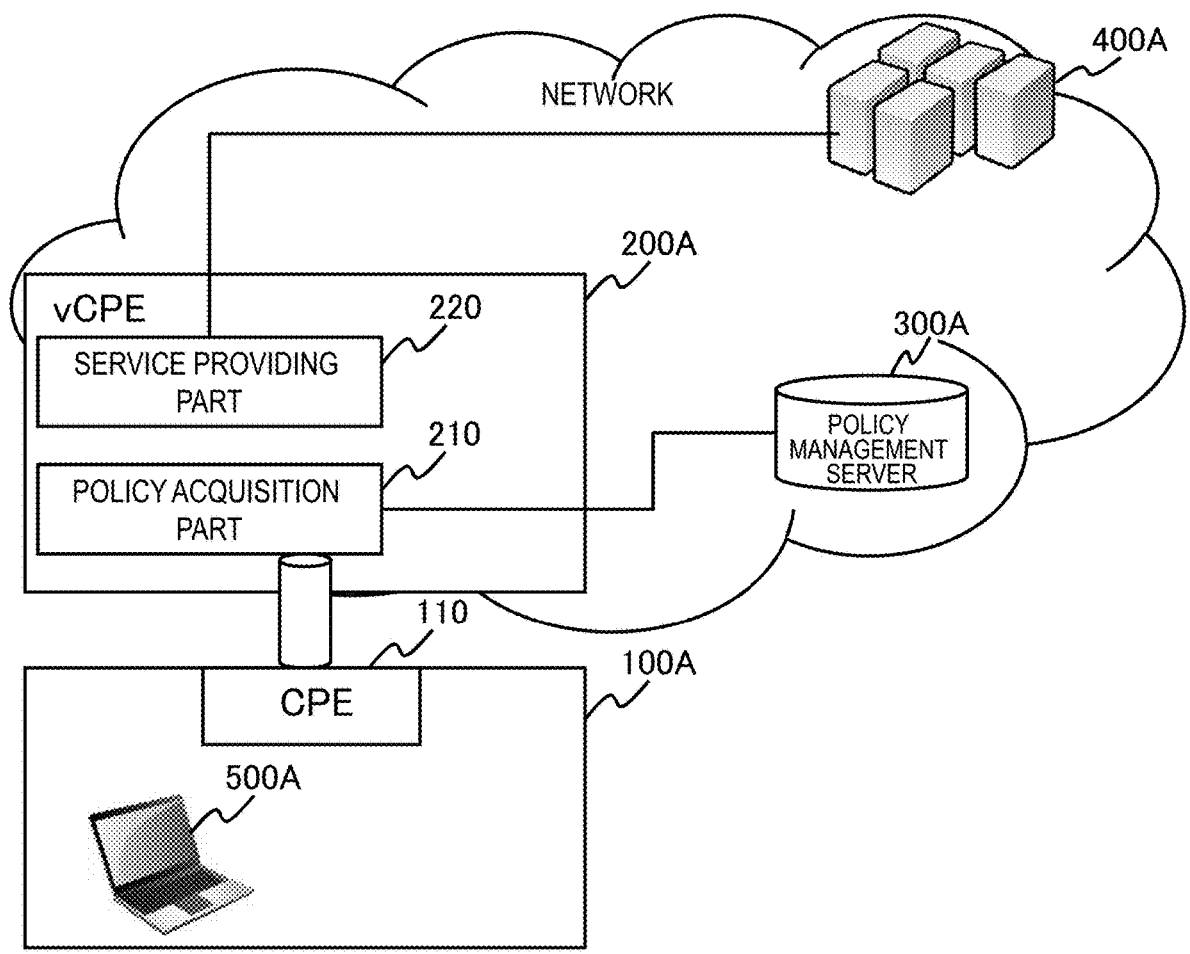
FIG. 1 is a diagram showing a configuration of an example embodiment of the present disclosure.

First, a description is given of an outline of example embodiments of the present disclosure, making reference to the drawings. It is to be noted that reference symbols in the drawings attached to this outline are added to respective elements for convenience as examples in order to aid understanding, and are not intended to limit the present disclosure to modes illustrated in the drawings. Connection lines between blocks in the diagrams referred to in the following description include both unidirectional or bidirectional. Unidirectional arrows schematically show flow of main signals (data), but do not exclude bidirectionality. Ports and interfaces are present at input output connection points of each block in the diagram, but illustrations thereof are omitted.

The present disclosure, in an example embodiment thereof as shown in FIG. 1, may be realized by a configuration that includes a policy management server 300A, vCPE (virtual customer premises equipment) 200A, and CPE (customer premises equipment) 110 for accessing the vCPE 200A. The policy management server 300A is a server that manages communication policy for user(s). The CPE 110 is a device such as a layer 2 switch or modem disposed in user premises 100A.

The vCPE 200A is disposed in a network including a policy acquisition part 210 and a service providing part 220. The policy acquisition part 210 acquires a communication policy including a condition (service providing condition) for providing a service to be provided to a terminal that provides access via the first CPE 110, from a policy management server 300A. The service providing part 220 provides a communication service to the terminal, making reference to the communication policy.

Figure 2:
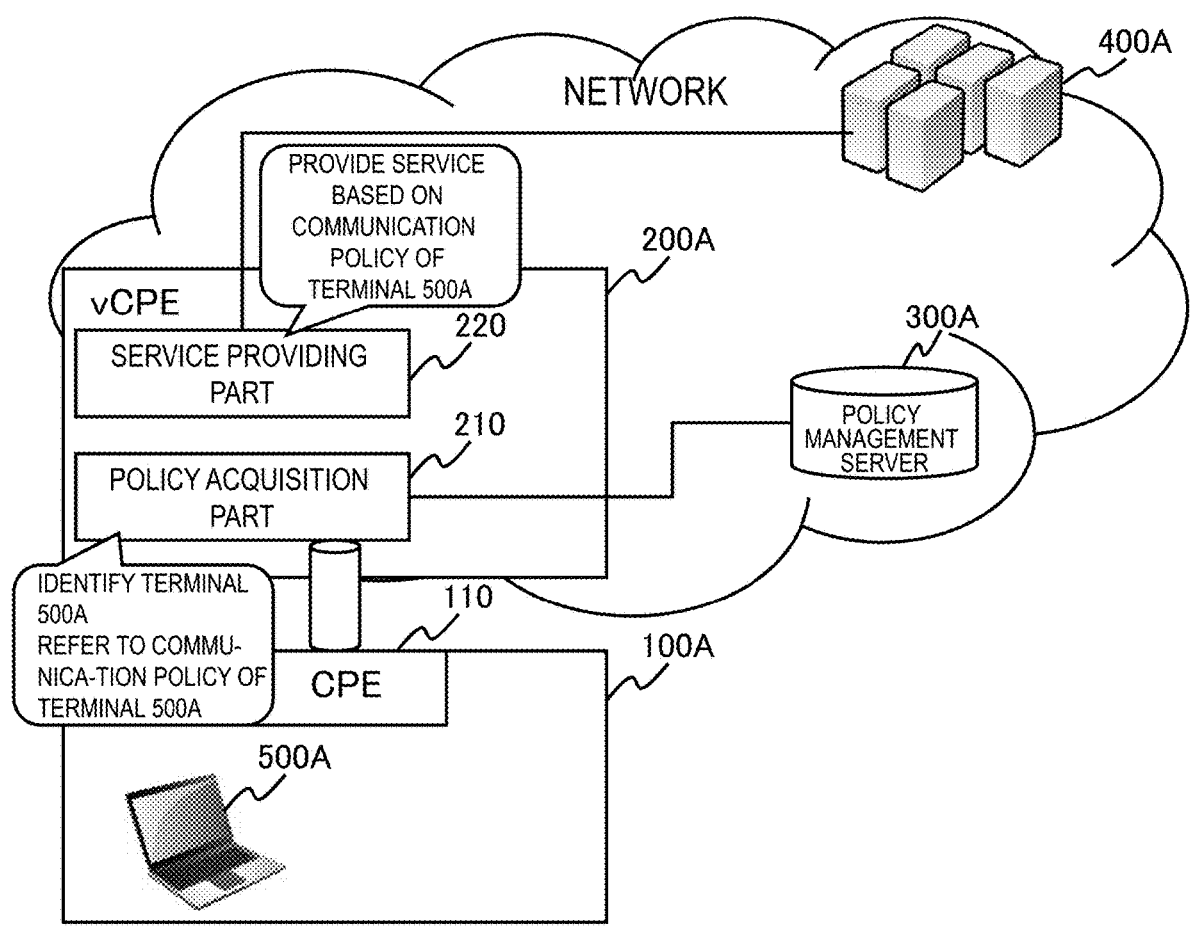
FIG. 2 is a diagram for illustrating operations of an example embodiment of the disclosure.

In addition, as shown in FIG. 2, the policy acquisition part 210 identifies a terminal 500A that has moved to the CPE 110 from a second CPE (not illustrated) that is different from the first CPE 110. The policy acquisition part 210 acquires a communication policy including a condition for providing a service to be provided to the identified terminal, from a policy management server 300A. The service providing part 220 provides a communication service so as to satisfy the condition for providing a service defined in the communication policy of the identified terminal 500A. For example, the service providing part 220 implements QoS control or charge management of a terminal unit, such that communication takes place between the terminal 500A and a service providing apparatus 400A, with a QoS (Quality of Service) defined in the communication policy of the terminal 500A.

As described above, according to the present disclosure it is possible to provide a service based on a communication policy of a terminal unit, in a system in which the vCPE 200A has been introduced. For example, assume that a user of the terminal 500A makes a contract with a communication service operator to be able to receive a service guaranteeing a predetermined QoS, under a pay-as-you-go charging condition. In this case, the vCPE 200A identifies the terminal 500A of the user in question and obtains a communication policy including the condition of providing a service to be provided to the terminal 500A, from the policy management server 300A. Since the vCPE 200A provides a service to the terminal 500A under the condition of providing a service included in the obtained communication policy, the user can receive the service at a predetermined QoS even at a location outside the home.

First Example Embodiment

Figure 3:
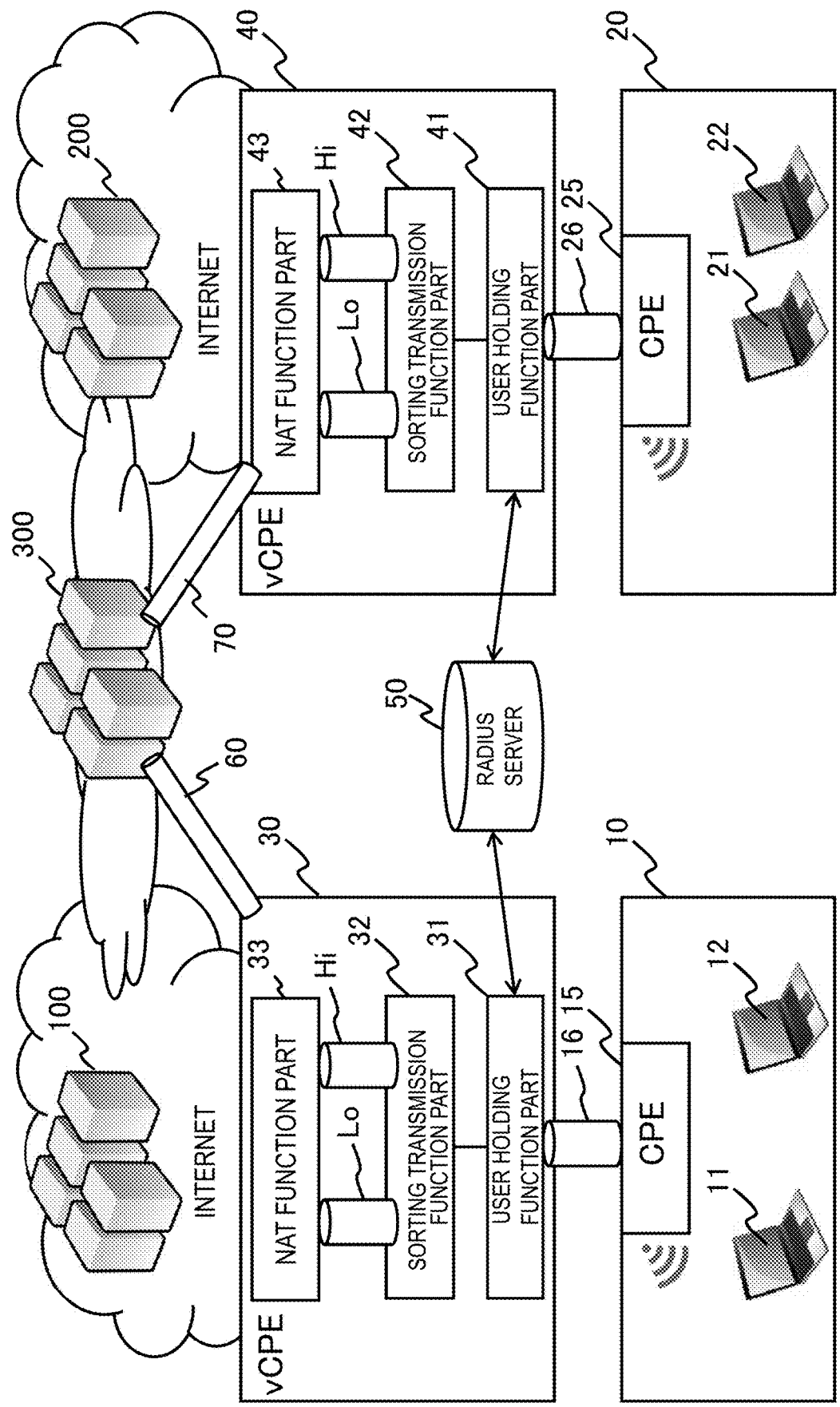
FIG. 3 is a diagram showing an overall configuration of a service providing system in a first example embodiment of the disclosure.

Next, a detailed description is given concerning a first example embodiment of the present disclosure, making reference to the drawings. FIG. 3 is a diagram showing an overall configuration of a service providing system in a first example embodiment of the disclosure. FIG. 3 illustrates: a network in which vCPE 30 and 40 and servers 100 to 300 are disposed; and home 10 of user A and home 20 of user B, which are the homes of 2 users A and B that can use vCPE 30 and 40.

In the example of FIG. 3, CPE 15 is disposed in the home 10 of user A. User A possesses terminals 11 and 12, and makes a contract including QoS guarantee and the like with a communication service operator in accordance with needs.

In the same way, CPE 25 is disposed in the home 20 of user B. User B possesses terminals 21 and 22, and makes a contract including QoS guarantee and the like with a communication service operator in accordance with needs.

The terminals 11, 12, 21 and 22 are provided with a wired and/or wireless communications interface, and by selecting these as appropriate, can connect to the CPE 15 and CPE 25.

The CPE 15 can connect to the vCPE 30 via a line A16 that user A has contracted with the communication service operator. Similarly, the CPE 25 can connect to the vCPE 40 via a line B26 that user B has contracted with a communication service operator.

The vCPE 30 is provided with a user holding function part 31, a sorting transmission function part 32, and a NAT (Network Address Translation) function part 33. Similarly, the vCPE 30 is provided with a user holding function part 41, a sorting transmission function part 42, and a NAT function part 43.

The user holding function parts 31 and 41 correspond to the abovementioned policy acquisition part 210, and on receiving a connection request from the terminals 11, 12, 21, 22, make a request to the RADIUS server 50 to search a communication policy table of the terminal in question. The user holding function parts 31 and 41 temporarily hold content of the communication policy table sent from the RADIUS server 50. While temporarily holding content of a communication policy table of a certain terminal, the user holding function parts 31 and 41 do not refer to the RADIUS server 50, even if a connection request is received from the terminal in question.

The sorting transmission function parts 32 and 42 connect with the NAT function parts 33 and 34, via a line of Low Quality ("Lo" in FIG. 3) or High Quality ("Hi" in FIG. 3). The sorting transmission function parts 32 and 42 select a Lo or Hi line, in accordance with the communication policy table of the user holding function parts 31 and 41, and connect with the NAT function parts 33 and 34. Therefore, the sorting transmission function parts 32, 42 correspond to the abovementioned service providing part 220.

The NAT function parts 33 and 43 are connected with servers 100 and 200 via the Internet. The NAT function parts 33 and 43 are connected with a server 300 via the Internet and dedicated lines 60 and 70. The NAT function parts 33 and 43 convert a local IP address to a global IP address in order to connect to these servers 100 to 300.

The servers 100 and 200 are servers that provide a service such as general video viewing or search via the Internet. A description is given in which the server 300 is a server that provides, in addition to a service such as general video viewing or search via the Internet, a high quality service such as video viewing or the like via dedicated lines 60, 70 to only a charged user.

Figure 4:
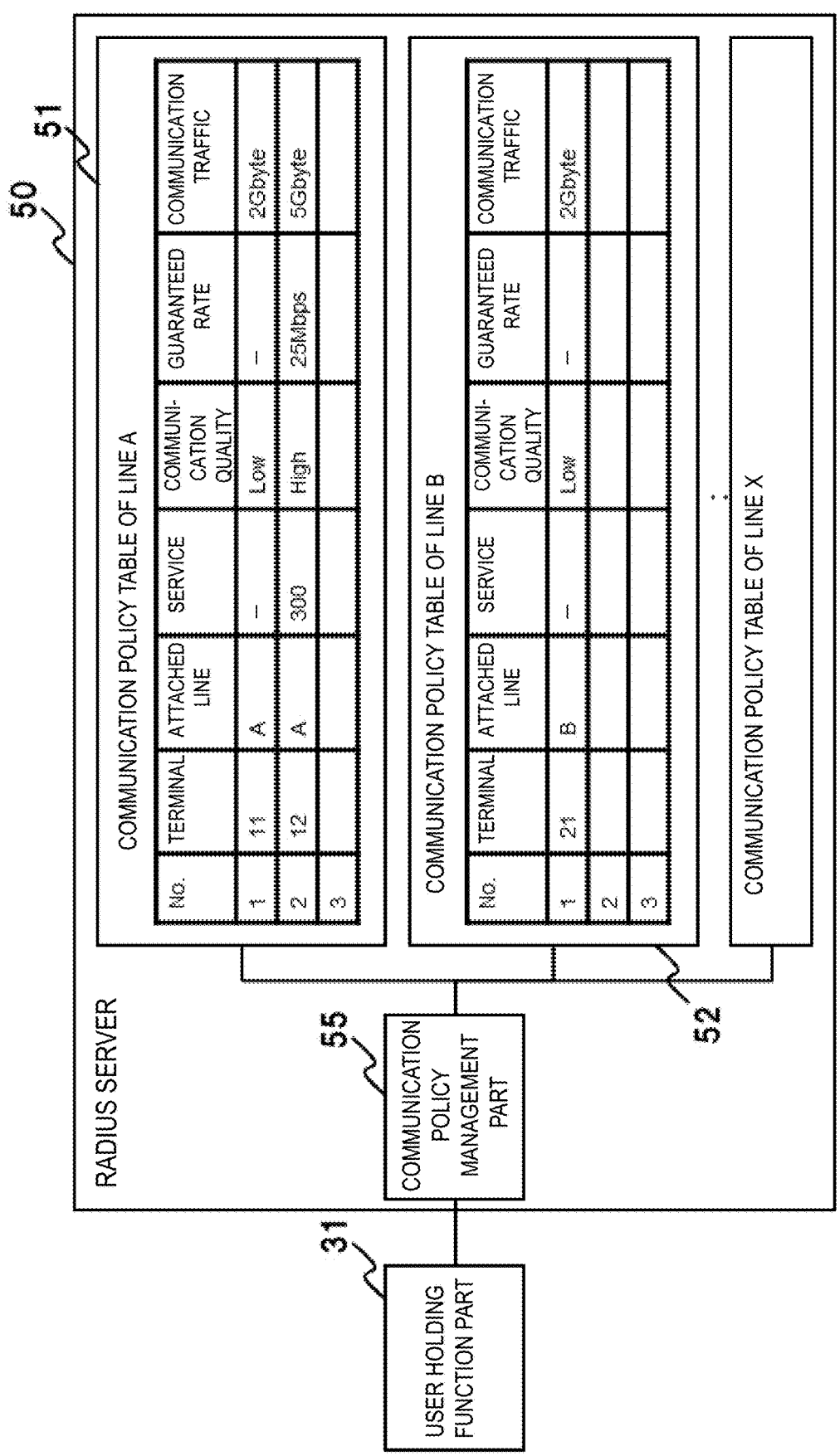
FIG. 4 is a diagram showing a configuration example of a RADIUS server in the first example embodiment of the disclosure.
Figure 5:
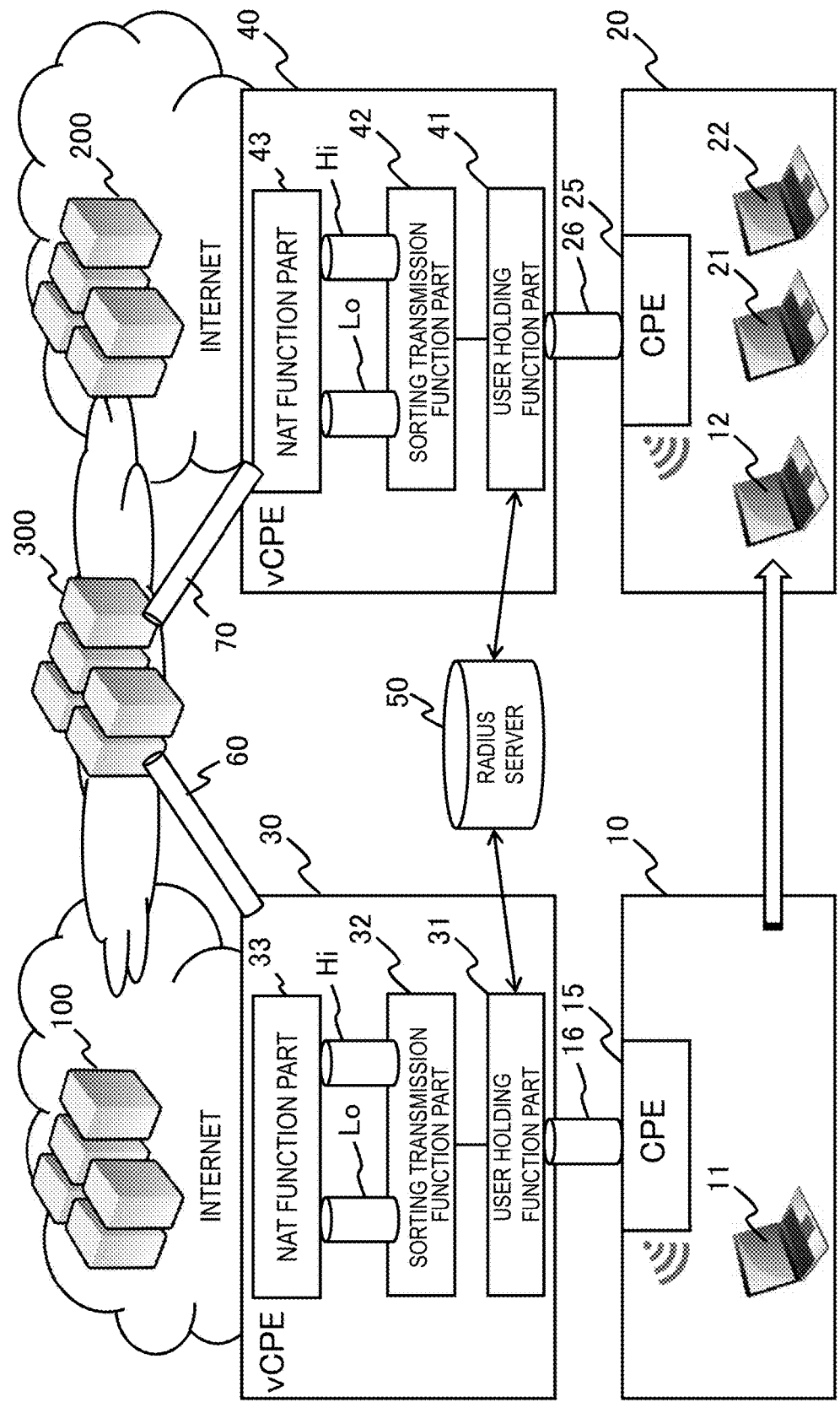
FIG. 5 is a diagram for illustrating operations of the first example embodiment of the disclosure.

Continuing, a detailed description is given concerning the RADIUS server 50 of FIG. 3, responsible for a function corresponding to the policy management server 300A of FIG. 1. FIG. 4 is a diagram showing a configuration example of the RADIUS server 50. FIG. 4 shows a configuration of the RADIUS server 50 that is provided with the communication policy tables 51 and 52 and the communication policy management part 55. It is to be noted that in the following description, the communication policy tables 51 and 52 are held in auxiliary storage of the RADIUS server 50 configuring the policy storage part.

It is to be noted that in the example of FIG. 4, a table is created for each line, that is, for each line between a user and a communication service operator, but creation modes of the table are not limited to the example of FIG. 4. For example, it is possible to have a configuration that manages contract content with a terminal with 1 table for each communication service operator, or a configuration in which a plurality of communication service operators manages contract content with a terminal using one integrated table. In the present example embodiment, a description is given where a table is created for each line, based on a management form of communication policy in the vCPE described in the background technology.

In the example of FIG. 4, the communication policy tables 51 and 52 are configured to record and manage terminal, affiliated line, service, communication quality, guaranteed rate (guaranteed bandwidth), and communication traffic. Clearly, items outside of these items may be added. A description is given below concerning content set in these respective items.

An identifier for uniquely identifying a terminal is contained in a terminal field. For this type of identifier, it is possible to use a MAC (Media Access Control) address, a terminal ID set by a user, a terminal ID given by a communication service operator, or the like.

A unique line identifier in set in an affiliation line field, to indicate what line (user home) a terminal is under the control of. For this type of line identifier, it is possible to use an identifier such as a VID (Virtual LAN Identifier), a line ID given by a communication service operator, or the like. This type of affiliation line information can be used when calculating price (demand charge) of a communication service.

A unique identifier (service identifier) indicating service on the Internet which the terminal in question can receive, is set in a service field. It is possible to use an identifier such as an IP address, a FQDN (Fully Qualified Domain Name) or the like, as the service identifier. In the example of FIG. 4, "300" is set in the service field of the terminal 12, but this indicates that the terminal 12 has the authority to receive a service from the server 300. It is to be noted that with regard to a free-of-charge service provided via the Internet, "-" is shown in the service field. It is to be noted that when searching service content received by a terminal described later in search having a terminal as a key, referring last to an entry where the service field is "-" is assumed. In this way, by treating an entry in which "-" is set in the service field as having low priority, it is possible to provide more advantageous (higher priority) service content according to the terminal.

The communication quality field indicates communication quality provided to respective terminals. In the example of FIG. 4, with regard to a free-of-charge service provided via the Internet (the service field is "-"), low quality "Low" is set as communication quality. Meanwhile, "High" is set as communication quality of the service 300 received from the server 300. Clearly, it is also possible to have a setting of "Low" for the service 300 received from the server 300. A limitation may be put on communication quality that can be set, according to service. For example, a selection system of "High" or "Low" for the service 300 received from the server 300 is assumed, but an assumption that enables setting of only "Low" for a free-of-charge service received from the servers 100, 200 may also be considered. It is to be noted that in the present example embodiment, there are 2 choices of "High" and "Low" as communication quality, but it is possible to have 3 or more levels of communication quality (choices), in accordance with type and specification of line between vCPE and NAT function parts.

In a guaranteed rate (guaranteed bandwidth) field, a data communication rate to be guaranteed is set in End-to-End communication from a server to a terminal, including a line contracted by a user. It is to be noted that in the example of FIG. 4, a value can be set in the guaranteed rate field only in a case where the communication quality field is "High". By so doing, when a service request is received specifying a guaranteed rate from a new terminal, it is possible to use an aggregate value of the present field, as information for deciding whether or not the terminal in question can be held.

The communication traffic field indicates the total communication traffic in a certain period for a terminal in question. This field can be used when performing control or the like according to the total communication traffic in a charge-according-to-usage rate structure billing or a fixed amount rate structure. In the present example embodiment, the rate system is not particularly limited to the charge-according-to-usage structure or the fixed amount structure. For the field, the RADIUS server 50 may automatically measure and record, without receiving a request from the vCPE. The field may be such that, on receiving a billing demand packet from the user holding function parts 31 and 41 of the vCPE 30 and 40, the RADIUS server 50 begins measurement and recording, and on receiving a billing stop demand packet, stops recording.

The communication policy management part 55 searches for an entry that defines service content for the terminal in question from respective communication policy tables 51 and 52, with an identifier of a terminal requested by the user holding function part 31 (or 41) as key. In a case where an entry for the terminal in question is found, the communication policy management part 55 responds with service content of the terminal in question to the user holding function part 31 (or 41). By this search process, in a case of detecting movement between terminal lines, the communication policy management part 55 performs terminal information continuity processing for the communication policy table of a movement destination line from the communication policy table of the movement origin line. When performing continuity processing, in a case where the communication quality of a target terminal is "High", the communication policy management part 55 compares a guaranteed bandwidth in the table and a bandwidth where End-to-End communication of a service from the terminal can be guaranteed, and determines whether or not holding is possible. In a case where a guaranteed bandwidth in the table cannot be secured, the communication policy management part 55 gives notification of whether or not holding of the target terminal is possible to the user holding function part 31 (or 41). It is to be noted that in a case where there has been an update in the communication policy table in the RADIUS server 50, notification is preferably given of the communication policy table after updating to the user holding function part. For example, after a certain user applies for a paid-for service in order to receive the service from the server 300, updating of the communication policy table and notification to the user holding function part 31 (or 41) are performed. Thus, in the following, the terminal of the user in question can receive provision of a service from the server 300 from that point in time.

It is to be noted that respective parts (processing means) of the vCPE 30, 40 and 200A shown in FIG. 1 and FIG. 3 can be realized by adding network functions to realize functions corresponding to the abovementioned respective parts (processing means), on a virtual platform using NFV (network function virtualization technology).

Continuing, a detailed description is given concerning operations of the first example embodiment of the present disclosure, making reference to the drawings. A description is given below divided into (1) registration of terminal information, (2) post-registration basic communication, and (3) communication after movement among terminal user homes. It is to be noted that with assumptions common to (1) to (3), each terminal already implements access authentication for connecting with CPE 15 and 25 by a wired or wireless communication interface, and a state exists where communication is possible via the CPE 15 and 25. It is to be noted that for access authentication in the abovementioned CPE, authentication ID/PW may be set by user A who is the owner of the CPE 15. In this way, communication via the CPE 15 may be limited to a user terminal for which user A has given consent.

(1) Registration of terminal information

It is assumed that when the terminal information is registered, the terminal 12 is present in the home 10 of user A before movement. The registration of the terminal information may be a registration or change by an operator that provides a communication service (communications service operator). For a registration or change by the user himself, it is possible to use a method of receiving the registration or change by using a registration service that uses a Web user interface (WUI) provided by the communications service operator or the like.

Registration or change by the communications service operator (example: terminals 11, 12 in the home 10 of user A)

When line A to the communications service operator begins operation, user A makes a request for identifiers of terminal 11 and terminal 12 to be used in home 10 of user A, and a service and communication quality to be requested with terminals 11, 12.

The communications service operator confirms that there is no irregularity with regard to the presence of a service or bandwidth guarantee, with respect to the received information in the request from user A. As a result of the confirmation, if there is an irregularity, the communications service operator makes a request for a correction to user A. If there is no problem, the communications service operator creates a communication policy table 51 for line A, in the RADIUS server 50, based on the request information, and registers terminal information corresponding to the terminals 11 and 12 in the communication policy table 51 of line A (refer to communication policy table in FIG. 4). It is to be noted that in a case where user A changes a provided service, a change request is made specifying information such as the identifier of the terminal to be changed, the service for which a change is desired, communication quality, and the like. The communications service operator confirms whether or not there is an irregularity with regard to service presence or bandwidth guarantee, with respect to the information in the change request. As a result of the confirmation, if there is an irregularity, the communications service operator makes a request for a correction to user A. If there is no problem, the communications service operator changes registered content of the communication policy table 51 for line A in the RADIUS server 50, based on the request information.

Additional registration or change using a registration service such as WUI by the user himself (example: terminal 22 in the home 20 of user B)

It is assumed that user B has already begun communication in line B by registration by the communication service providing operator and is performing registration of the terminal 21 in the RADIUS server 50 (refer to FIG. 4).

Figure 6:
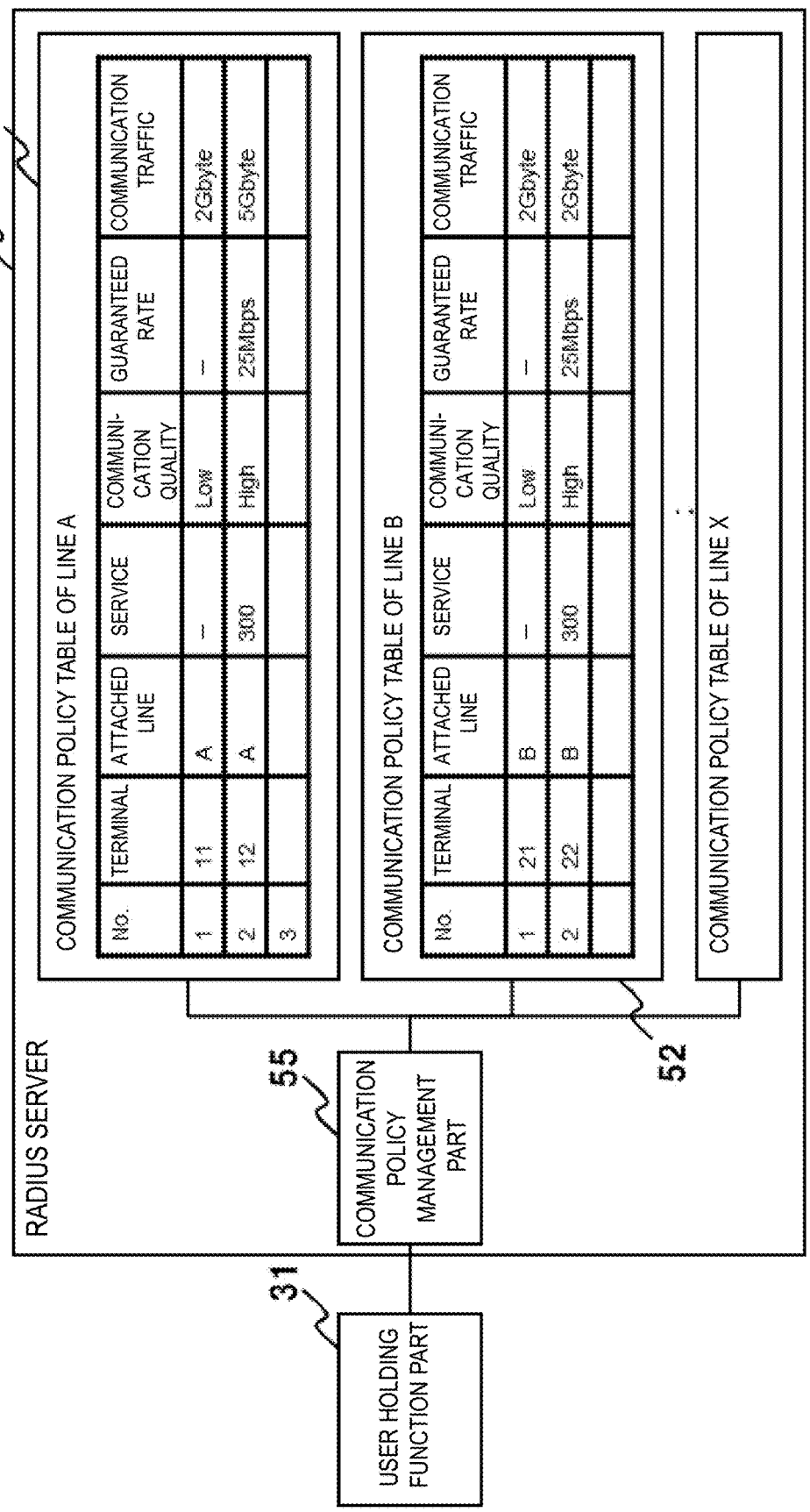
FIG. 6 is a diagram for illustrating information held by the RADIUS server and changes thereof in the first example embodiment of the disclosure.

User B uses a registration service such as a WUI at the terminal 21 that is capable of communication, and additionally registers the identifier of terminal 22, a service requested, and communication quality. The communications service operator confirms whether or not there is an irregularity in service presence and bandwidth guarantee, with respect to the registration information. As a result of the confirmation, if there is an irregularity, the communications service operator makes a request for a correction to user B. If there is no problem, the communications service operator adds terminal information corresponding to the terminal 22 in the communication policy table 52 of line B that has already been created in the RADIUS server 50 (refer to FIG. 6). In a case where user B changes a provided service, a change request is made specifying the identifier of the terminal to be changed, the service for which a change is desired, and communication quality, using a registration service such as WUI or the like. The communications service operator confirms whether or not there is an irregularity with regard to bandwidth guarantee, with respect to the information in the change request. If there is an irregularity, the communications service operator makes a request for a correction to user B. If there is no problem, the communications service operator reflects content requesting a change in the communication policy table 52 of line B for the RADIUS server 50.

(2) Post-registration basic communication

It is assumed that at the time of the communication in question the terminal 12 has not yet moved and is present in the home 10 of user A. In (1) the registration of the terminal information, it is assumed that with a state where only registration by the communication service operator is performed, an entry corresponding to the terminals 11 and 12 is registered in the communication policy table 51 for line A in the RADIUS server 50. Similarly, only an entry corresponding to terminal 21 is registered in the communication policy table 52 of line B (refer to FIG. 4). After registration, terminals 11, 12 and 21 do not perform communication directed to servers 100 to 300, and a temporary communication policy table is not held in the user holding function part.

Communication of terminal registered in RADIUS server 50 (example: terminal 11 performs communication to server 100)

It is assumed that terminal 11 transmits an initial packet with server 100 as a destination. The user holding function part 31 of the vCPE 30 receives the initial packet via the CPE 15 and line A16. On receiving the initial packet, the user holding function part 31 confirms whether or not an entry is present that corresponds to the communication, in a temporary communication policy table of line A held by itself. Specifically, the user holding function part 31 confirms whether or not an entry is present in the communication policy table, corresponding to a line identifier such as VID or the like, an identifier of terminal 11, or a service (an identifier such as a destination IP address or FQDN in the initial packet). Here, since it is the initial packet, the user holding function part 31 does not hold registration information of the terminal 11 in the communication policy table of line A. Therefore, the user holding function part 31 makes a request for confirmation as to whether or not the registration information in question is there, by specifying line identifier, identifier of terminal 11, and service, with respect to the RADIUS server 50. The RADIUS server 50 that receives the configuration request refers to the communication policy table of line A, and confirms whether or not an entry is present that corresponds to received content. As a result of the confirmation, since it is confirmed that the communication policy table 51 of line A has information of terminal 11 and service "-" (refer to FIG. 4), the RADIUS server 50 gives notification of the relevant entry of the communication policy table 51 of line A to the user holding function part 31. The user holding function part 31 temporarily holds the entry of the communication policy table 51 of line A that has been notified. In the following, the sorting transmission function part 32 selects a line of Low Quality based on content of the communication policy table 51 of line A held by the user holding function part 31, and transmits the initial packet and subsequent communication traffic to the NAT function part 33. The NAT function part 33 converts the local IP address of the received packet to a global IP address, and transmits the communication traffic via the Internet towards the server 100. By the above communication, the terminal 11 and the server 100 can perform communication with each other, and the terminal 11 can receive a service from the server 100.

Communication of terminal not registered in RADIUS server (example: terminal 22 not registered in the RADIUS server 50 performs communication to server 200)

It is assumed that terminal 22 transmits an initial packet with server 200 as a destination. The user holding function part 41 of a vCPE system 40 receives the initial packet via the CPE 25 and line B26. On receiving the initial packet, the user holding function part 41 confirms whether or not an entry is present that corresponds to the communication, in a temporary communication policy table of line B held by itself. Specifically, the user holding function part 41 confirms whether or not an entry is present in the communication policy table, which corresponds to a line identifier such as VID or the like, an identifier of terminal 22, or a service (an identifier such as a destination IP address or FQDN in the initial packet). Here, since it is the initial packet, the user holding function part 41 does not hold registration information of the terminal 22 in the communication policy table of line B. Therefore, the user holding function part 41 makes a request for confirmation as to whether or not the registration information in question is there, by specifying a line identifier and identifier of terminal 22, and service, with respect to the RADIUS server 50. The RADIUS server 50 that receives the confirmation request refers to the communication policy table 52 of line B, and confirms whether or not an entry is present that corresponds to the received content. As a result of the confirmation, since it could not be confirmed that the entry in question is present is the communication policy table 52 of line B, the RADIUS server 50 confirms whether or not an entry is present that corresponds to the received content. Specifically, the RADIUS server 50 refers to the communication policy table (communication policy table of line X or the like) of another line, and confirms whether or not an entry is present that corresponds to the received content. As a result of the confirmation, since it has not been confirmed whether the entry in question is present in the communication policy table of the other line (refer to FIG. 4), the RADIUS server 50 returns an authentication error notification to the user holding function part 41. The terminal 22 that receives the error notification cannot communicate with the server 200, and cannot receive a service from the server 200. It is to be noted that when the RADIUS server 50 receives the confirmation request, there is an entry for terminal 22, but the value of the service field may not match. This case may also be treated similarly to a case where the entry in question is not present in the communication policy table 52 of line B.

(3) Communication after movement among terminal user homes (example: the terminal 12 uses line B to perform communication with the server 300 with communication quality of "High Quality" registered in home 10 of user A)

A description is given below of operations assuming that terminal 12 moves from home 10 of user A to home 20 of user B, and communication is firstly performed. An entry corresponding to terminal 12 is not registered in the communication policy table 52 of line B of the RADIUS server 50. Meanwhile, a description is given in which entries corresponding to terminals 21 and 22 are registered in the communication policy table 52, and user B is already using a communication service with terminals 21 and 22 (refer to FIG. 6).

Figure 7:
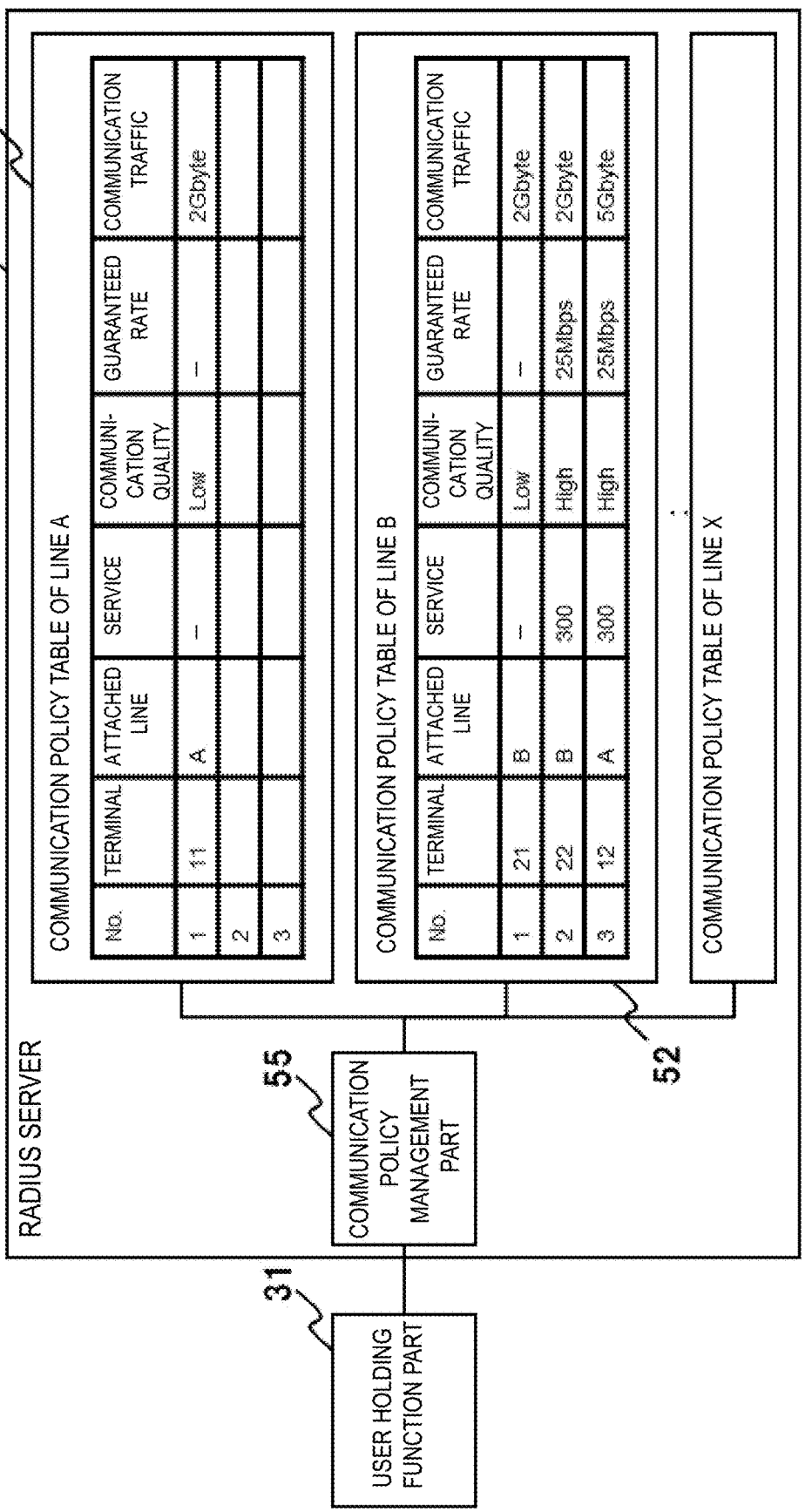
FIG. 7 is a diagram for illustrating information held by the RADIUS server and changes thereof in the first example embodiment of the disclosure.

Terminal 12 transmits an initial packet with server 300 as a destination. The user holding function part 41 of the vCPE 40 receives the initial packet via the CPE 25 and line B26. On receiving the initial packet, the user holding function part 41 confirms whether or not an entry is present that corresponds to the communication, in a temporary communication policy table of line B held by itself. Specifically, the user holding function part 41 confirms whether or not an entry is present in the communication policy table, which corresponds to a line identifier such as VID or the like, an identifier of terminal 12, or a service (an identifier such as a destination IP address or FQDN in the initial packet). Here, since it is the initial packet, the user holding function part 41 does not hold an entry corresponding to terminal 12 in the communication policy table 52 of line B. Therefore, the user holding function part 41 makes a request for confirmation as to whether or not the entry in question is there, by specifying a line identifier, an identifier of terminal 22, and service, with respect to the RADIUS server 50. The RADIUS server 50 that receives the confirmation request refers to the communication policy table 51 of line A and the communication policy table 52 of line B, and confirms whether or not an entry is present that corresponds to the received content. As a result of the confirmation, if there is no relevant entry, the RADIUS server 50 sequentially refers to the communication policy table of other lines, and confirms whether or not an entry is present that corresponds to the received content. As a result of the confirmation, the RADIUS server 50 confirms whether an entry of terminal 12 and service "300" is present in the communication policy table 51 of line A (refer to FIG. 6). Here, since the communication quality field of the entry in question of terminal 12 is "High", the communication policy management part 55 compares guaranteed rate for the terminal 12 and guaranteed bandwidth where End-to-End communication of a service 300 from the terminal 12 can be guaranteed, and determines whether or not holding is possible. As a result of the determination, in a case where holding is confirmed to be possible, the communication policy management part 55 moves the entry of terminal 12 of the communication policy table of line A to the communication policy table of line B. In this way, the entry of terminal 12 of the communication policy table 51 of line A is deleted, and an entry of terminal 12 of the communication policy table 52 of line B is newly added (refer to FIG. 7). It is to be noted that in a case where the determination of whether holding is possible is that it is not possible, the RADIUS server 50 returns a notification that holding is not possible, and subsequent updating processing of the communication policy table is not performed.

By updating of the abovementioned communication policy table, when a terminal is judged to have moved, the communication policy management part 55, with an object of optimizing held information related to a session, may be able to set a function to delete held information related to a session of the terminal 12 before movement. For this held information related to a session, a communication policy table temporarily held by the user holding function part, a sorting table of a sorting transmission function part, or a NAT table of a NAT function part may be cited.

Thereafter, the RADIUS server 50 newly gives notification of an entry of the communication policy table 52 of line B to the user holding function part 41. The user holding function part 41 temporarily holds the entry related to terminal 12 of the communication policy table 52 of line B that has been notified, in its own communication policy table.

The sorting transmission function part 42 selects a line "Hi" based on information of the communication policy table 52 of line B held by the user holding function part 41, and transmits the initial packet and subsequent communication traffic to the NAT function part 43. The NAT function part 43 converts the local IP address of the packet to a global IP address, and transmits the communication traffic via a dedicated line 70 towards the service 300. By the above communication, the terminal 12 and the server 300 can perform communication with each other, and even after movement the terminal 12 can receive a service from the server 300.

Figure 8:
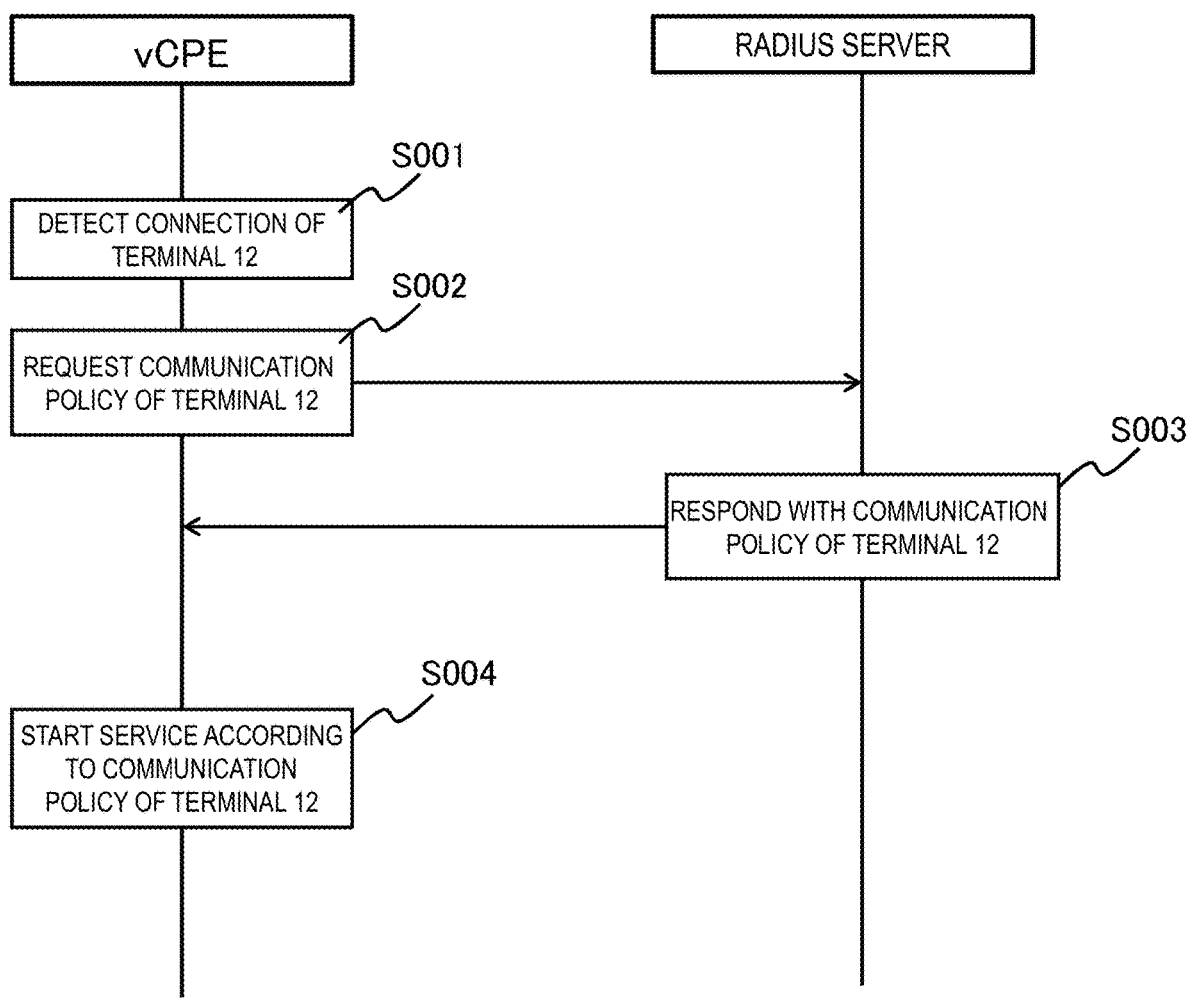
FIG. 8 is a sequence diagram representing operations of the first example embodiment of the disclosure.

When the above terminal 12 uses line B to arrange operations when performing communication with the server 300 with communication quality of "High Quality" registered for the home 10 of user A, FIG. 8 is applicable. That is, on detecting a connection with the terminal 12, by receiving the initial packet from the terminal 12, (step S001), the vCPE 40 makes a request to the RADIUS server 50 for the communication policy of the terminal 12 (step S002).

The RADIUS server 50 refers to the communication policy table held by itself, searches for the communication policy of the terminal 12, and returns the result thereof to the vCPE 40 (step S003). In the following, the vCPE 40 begins providing a service based on the communication policy received from the RADIUS server 50 (step S004).

As described above, according to the present example embodiment, it is possible to provide service to a terminal that has moved between locations (between CPE), without changing service and communication quality contracted at its own location. As shown in change of the respective communication policy tables in the RADIUS server 50 of the present example embodiment, according to the present example embodiment it is possible to realize continuity of information related to authentication and billing for each terminal.

A description has been given above of respective example embodiments of the present disclosure, but the present disclosure is not limited to the abovementioned example embodiments, and modifications, substitutions and adjustments may be added within a scope that does not depart from fundamental technical concepts of the disclosure. For example, network configurations, respective element configurations and message expression forms shown in the respective drawings are examples for the purpose of aiding understanding of the disclosure, and are not intended to limit the disclosure to configurations illustrated in the drawings.

For example, in the abovementioned first example embodiment, a description is given citing an example in which users A and B each possess 2 terminals, and terminal 12 of user A uses CPE 25 and vCPE 40 of user B to receive a service. Clearly, it is also possible to receive the service by using the CPE 15 and vCPE 30 of user A at a terminal of user B.

In the abovementioned first example embodiment, a description has been given where a communication policy table is provided for each line, but as mentioned before, terminal information of each user may be managed using 1 communication policy table. Similarly, a plurality of communication service operators may manage terminal information of each user using 1 communication policy table.

Figure 9:
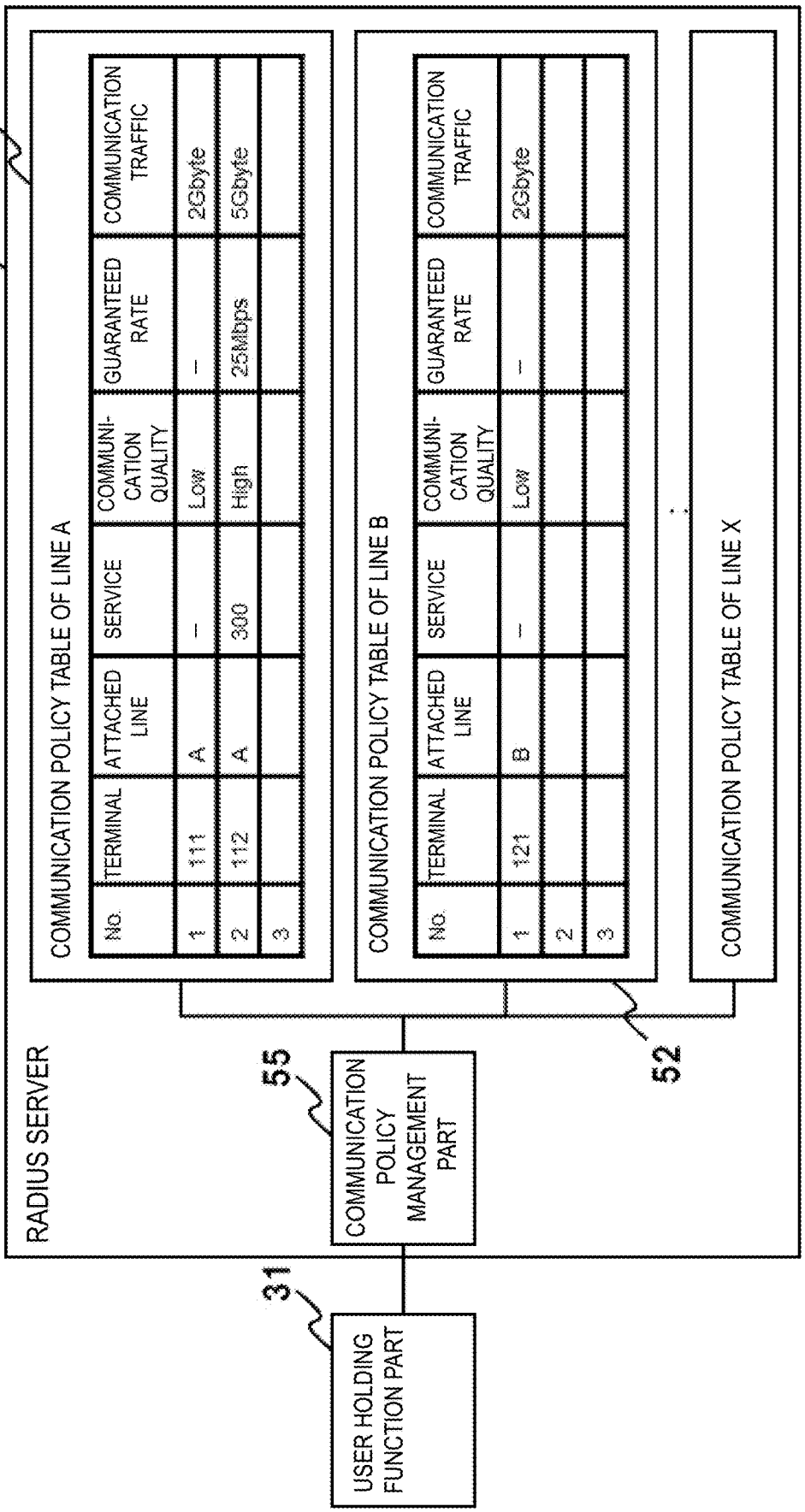
FIG. 9 is a diagram showing a configuration example of a RADIUS server in a modified example embodiment of the disclosure.

In the abovementioned first example embodiment, a description has been given in which a terminal field is provided in the communication policy tables 51 and 52, and search is performed with a terminal as key, but a user field may be provided instead of the terminal field (refer to FIG. 9). By so doing, it is possible to perform authentication with a user as a unit, rather than authenticating and identifying for a terminal unit, and to be applicable also to a communication system providing a service.

Figure 10:
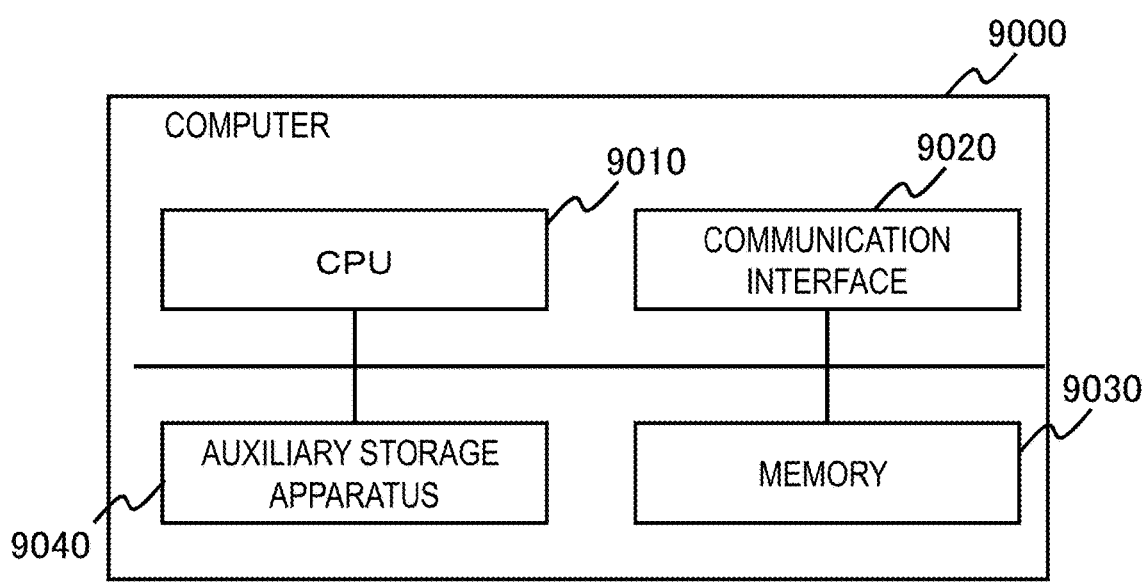
FIG. 10 is a diagram showing a configuration of a computer configuring virtual customer premises equipment or the RADIUS server in the disclosure.

According to the abovementioned example embodiment, realization is possible in a computer functioning as virtual customer premises equipment or a RADIUS server (9000 in FIG. 10), by a program implementing functions of these apparatuses. Such a computer is exemplified in a configuration provided with a CPU (Central Processing Unit) 9010, a communication interface 9020, a memory 9030, and an auxiliary storage apparatus 9040, of FIG. 10. That is, a policy acquisition program, a service providing program and the like may be executed in the CPU 9010 of FIG. 10, and update processing of respective calculated parameters held in the auxiliary storage apparatus may be implemented.

Finally, preferred modes of the present disclosure are summarized.

<First Mode>
(Refer to the virtual customer premises equipment according to the first aspect described above.)

<Second Mode>
The virtual customer premises equipment preferably includes a network address converter that performs address conversion necessary for receiving a service from the Internet, for the terminal.

<Third Mode>
The service providing part of the virtual customer premises equipment can provide a communication service using at least 2 lines, guaranteeing differing QoS, and the service providing part can have a configuration that performs selection of a line provided to the terminal, based on QoS information defined in the condition for providing the service.

<Fourth Mode>
The service providing part of the abovementioned virtual customer premises equipment preferably transmits a billing demand packet to a predetermined billing server, based on the condition for providing the service.

<Fifth Mode>
The policy acquisition part of the abovementioned virtual customer premises equipment, in a case of not being able to acquire a communication policy of a terminal that has moved to the first customer premises equipment from second customer premises equipment different from the first customer premises equipment, can have a configuration to reject providing a service to the terminal that has moved to the first customer premises equipment.

<Sixth Mode>
The policy acquisition part of the abovementioned virtual customer premises equipment, in a case of a response of not being able to satisfy a condition of providing a service for a terminal that has moved to the first customer premises equipment from second customer premises equipment different from the first customer premises equipment, from the policy management server, can have a configuration to reject providing a service to the terminal that has moved to the first customer premises equipment.

<Seventh Mode>
The policy acquisition part of the abovementioned virtual customer premises equipment, instead of a communication policy including a condition for providing a service to be provided to the terminal, identifies a user of a terminal that has moved to the first customer premises equipment from second customer premises equipment different from the first customer premises equipment, and acquires a communication policy including a condition for providing a service to be provided to the user of the identified terminal managed by the predetermined authentication server, and the service providing part can have a configuration to provide a communication service so as to satisfy the condition for providing a service defined in the communication policy of the identified user.

<Eighth Mode>
(Refer to the policy management server according to the second aspect described above.)

<Ninth Mode>
(Refer to the service providing method according to the third aspect described above.)

It is to be noted that the eighth and ninth modes may be expanded with regard to the second to seventh modes, similar to the first mode.

It is to be noted that the various disclosures of the abovementioned Patent Literature are incorporated herein by reference thereto. Modifications and adjustments of example embodiments and examples may be made within the bounds of the entire disclosure (including the scope of the claims) of the present disclosure, and also based on fundamental technological concepts thereof. Various combinations and selections (including partial deletions) of various disclosed elements (including respective elements of the respective claims, respective elements of the respective example embodiments and examples, respective elements of the respective drawings and the like) are possible within the scope of the disclosure of the present disclosure. That is, the present disclosure clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST

10 home of user A
11, 12, 21, 22, 500A terminal
15, 25, 110 CPE (customer premises equipment)
16, 26 lines between CPE-vCPE
20 home of user B
30, 40, 200A vCPE (virtual customer premises equipment)
33, 34 user holding function part
32, 42 sorting transmission function part
33, 43 NAT function part
50 RADIUS server
51, 52 communication policy table 55 communication policy management part
60, 70 dedicated line
100 to 300 server
100A inside user home (premises)
210 policy acquisition part
220 service providing part
300A policy management server
400A service providing apparatus

The invention claimed is:

1. A Virtual customer premises equipment comprising:
a policy acquisition part configured to acquire, from a predetermined policy management server that manages a communication policy of a user of the virtual customer premises equipment, a communication policy that includes a condition for providing a service to be provided to a terminal that performs access via first customer premises equipment; and
a service providing part configured to provide a communication service to the terminal by referring to the communication policy; wherein
the policy acquisition part identifies a terminal that has moved to the first customer premises equipment from second customer premises equipment different from the first customer premises equipment, and acquires from the predetermined policy management server a communication policy including a condition for application of a service to be provided to the identified terminal, and
the service providing part provides a communication service so as to satisfy the condition for providing a service defined in the communication policy of the identified terminal.

2. The virtual customer premises equipment according to claim 1, further comprising: a network address converter configured to perform address conversion necessary for receiving a service from the Internet, for the identified terminal.

3. The virtual customer premises equipment according to claim 2, wherein
the service providing part can provide a communication service using at least 2 lines, guaranteeing differing QoS, and
the service providing part performs selection of a line provided to the identified terminal, based on QoS information defined in the condition for providing the service.

4. The virtual customer premises equipment according to claim 2, wherein the service providing part transmits a billing demand packet to a predetermined billing server, based on the condition for providing the service.

5. The virtual customer premises equipment according to claim 2, wherein the policy acquisition part, in a case of not being able to acquire a communication policy of a terminal that has moved to the first customer premises equipment from second customer premises equipment different from the first customer premises equipment, rejects providing a service to the terminal that has moved to the first customer premises equipment.

6. The virtual customer premises equipment according to claim 2, wherein the policy acquisition part, in a case of there being a response of not being able to satisfy a condition for providing a service to a terminal that has moved to the first customer premises equipment from second customer premises equipment different from the first customer premises equipment, from the policy management server, rejects providing a service to the terminal that has moved to the first customer premises equipment.

7. The virtual customer premises equipment according to claim 1, wherein
the service providing part can provide a communication service using at least 2 lines, guaranteeing differing QoS, and
the service providing part performs selection of a line provided to the identified terminal, based on QoS information defined in the condition for providing the service.

8. The virtual customer premises equipment according to claim 7, wherein the service providing part transmits a billing demand packet to a predetermined billing server, based on the condition for providing the service.

9. The virtual customer premises equipment according to claim 7, wherein the policy acquisition part, in a case of not being able to acquire a communication policy of a terminal that has moved to the first customer premises equipment from second customer premises equipment different from the first customer premises equipment, rejects providing a service to the terminal that has moved to the first customer premises equipment.

10. The virtual customer premises equipment according to claim 7, wherein the policy acquisition part, in a case of there being a response of not being able to satisfy a condition for providing a service to a terminal that has moved to the first customer premises equipment from second customer premises equipment different from the first customer premises equipment, from the policy management server, rejects providing a service to the terminal that has moved to the first customer premises equipment.

11. The virtual customer premises equipment according to claim 1, wherein the service providing part transmits a billing demand packet to a predetermined billing server, based on the condition for providing the service.

12. The virtual customer premises equipment according to claim 11, wherein the policy acquisition part, in a case of not being able to acquire a communication policy of a terminal that has moved to the first customer premises equipment from second customer premises equipment different from the first customer premises equipment, rejects providing a service to the terminal that has moved to the first customer premises equipment.

13. The virtual customer premises equipment according to claim 11, wherein the policy acquisition part, in a case of there being a response of not being able to satisfy a condition for providing a service to a terminal that has moved to the first customer premises equipment from second customer premises equipment different from the first customer premises equipment, from the policy management server, rejects providing a service to the terminal that has moved to the first customer premises equipment.

14. The virtual customer premises equipment according to claim 1, wherein the policy acquisition part, in a case of not being able to acquire a communication policy of a terminal that has moved to the first customer premises equipment from second customer premises equipment different from the first customer premises equipment, rejects providing a service to the terminal that has moved to the first customer premises equipment.

15. The virtual customer premises equipment according to claim 14, wherein the policy acquisition part, in a case of there being a response of not being able to satisfy a condition for providing a service to a terminal that has moved to the first customer premises equipment from second customer premises equipment different from the first customer premises equipment, from the policy management server, rejects providing a service to the terminal that has moved to the first customer premises equipment.

16. The virtual customer premises equipment according to claim 1, wherein the policy acquisition part, in a case of there being a response of not being able to satisfy a condition for providing a service to a terminal that has moved to the first customer premises equipment from second customer premises equipment different from the first customer premises equipment, from the policy management server, rejects providing a service to the terminal that has moved to the first customer premises equipment.

17. The virtual customer premises equipment according to claim 1, wherein
the policy acquisition part, instead of a communication policy including a condition for providing a service to be provided to the terminal, identifies a user of a terminal that has moved to the first customer premises equipment from second customer premises equipment different from the first customer premises equipment, and acquires a communication policy including a condition for providing a service to be provided to the identified user of the terminal managed by the predetermined policy management server, and
the service providing part provides a communication service so as to satisfy the condition for providing a service defined in the communication policy of the identified user of the terminal.

18. A policy management server comprising:
a policy storage part configured to manage a communication policy including a condition for providing a service to be provided to a specific terminal based on a contract with a user of the specific terminal, and
a policy management part configured to select a communication policy corresponding to a terminal referenced by virtual customer premises equipment from the policy storage part, and provides the selected communication policy to the virtual customer premises equipment.

19. The policy management server according to claim 18, wherein the policy management part uses a table created for a communication service operator, as the policy storage part, to manage a correspondence relationship between the specific terminal and customer premises equipment.

20. A service providing method comprising:
identifying a terminal that has moved to first customer premises equipment from second customer premises equipment different from the first customer premises equipment, and acquiring, from a predetermined policy management server that manages a communication policy of a user of virtual customer premises equipment, a communication policy including a condition for providing a service to be provided to the identified terminal that performs access via the first customer premises equipment; and
providing a communication service to the identified terminal by referencing the communication policy so as to satisfy the condition for providing a service defined in the communication policy of the identified terminal.

* * * * *